(12) United States Patent
Rhodes

(10) Patent No.: US 11,298,762 B2
(45) Date of Patent: Apr. 12, 2022

(54) TABLE SAW AND MITER SAW COMBINATION APPARATUS

(71) Applicant: Lawrence Rhodes, Jackson, MI (US)

(72) Inventor: Lawrence Rhodes, Jackson, MI (US)

( * ) Notice: Subject to any disclaimer, the term of this patent is extended or adjusted under 35 U.S.C. 154(b) by 58 days.

(21) Appl. No.: 16/515,861

(22) Filed: Jul. 18, 2019

(65) Prior Publication Data

US 2021/0016373 A1    Jan. 21, 2021

(51) Int. Cl.

| B23D 47/02 | (2006.01) |
|---|---|
| B23D 45/06 | (2006.01) |
| B27B 27/04 | (2006.01) |
| B23D 59/00 | (2006.01) |
| B27B 27/02 | (2006.01) |
| B23D 45/04 | (2006.01) |

(52) U.S. Cl.
CPC ......... *B23D 47/025* (2013.01); *B23D 45/044* (2013.01); *B23D 45/06* (2013.01); *B23D 59/003* (2013.01); *B27B 27/02* (2013.01); *B27B 27/04* (2013.01)

(58) Field of Classification Search
CPC .... B23D 47/025; B23D 45/044; B23D 45/06; B23D 59/003; B23D 47/02; B23D 59/00; B27B 27/02; B27B 27/04; B27B 29/085; B27B 5/243; B25H 1/12; A47B 57/265; A47B 96/024
USPC ................. 83/477.1, 477.2, 477.3, 438, 520; 144/286.5

See application file for complete search history.

(56) References Cited

U.S. PATENT DOCUMENTS

| 1,924,672 | A |   | 8/1933  | Zachara    |                       |
|-----------|---|---|---------|------------|-----------------------|
| 4,133,237 | A | * | 1/1979  | Lewin      | B23D 47/025  83/468.3 |
| 4,335,765 | A | * | 6/1982  | Murphy     | B23D 47/025  144/286.1|
| 5,193,598 | A | * | 3/1993  | Estrem     | B23D 47/025  108/135  |
| 5,431,206 | A | * | 7/1995  | McAllister | B27C 9/04    108/13   |
| 5,787,779 | A |   | 8/1998  | Garuglieri |                       |
| 5,863,052 | A | * | 1/1999  | Roman      | B23D 47/025  144/286.1|
| D409,066  | S |   | 5/1999  | Welsh      |                       |
| 6,948,539 | B1| * | 9/2005  | Barker     | B23D 47/025  144/285  |
| 6,966,350 | B1| * | 11/2005 | Gist       | B23D 47/025  144/285  |
| 7,159,629 | B1| * | 1/2007  | Rowe       | B23D 47/025  144/285  |

(Continued)

*Primary Examiner* — Nhat Chieu Q Do

(57) ABSTRACT

A table saw and miter saw combination apparatus for combining the functionalities of table saws and miter saws includes a table housing having a table blade slot extending through to a table inside. A table saw is coupled to the table housing within the table inside and has a table blade extending through the table blade slot. The table saw has a power switch coupled to the table front side. A miter housing is coupled to the table housing. The miter top side has a base cutout. A miter base is coupled to the miter housing being pivotably coupled within the base cutout. The miter base has a miter blade slot extending therethrough. A miter saw is coupled to the miter housing. The miter saw has a miter arm. The miter saw has a miter handle coupled the miter arm. The miter handle has a power trigger.

11 Claims, 4 Drawing Sheets

(56) References Cited

U.S. PATENT DOCUMENTS

| | | | | |
|---|---|---|---|---|
| D588,773 S * | 3/2009 | Cona | | D34/20 |
| 7,647,956 B1 * | 1/2010 | Cona | | B25H 1/14 |
| | | | | 144/286.5 |
| 7,752,951 B2 | 7/2010 | Ouellette | | |
| 8,485,078 B2 | 7/2013 | Janson | | |
| 8,497,816 B2 * | 7/2013 | Coloma | | G02B 27/01 |
| | | | | 345/1.1 |
| 9,314,858 B2 | 4/2016 | Rowe | | |
| 9,393,630 B2 | 7/2016 | He | | |
| 2002/0152935 A1 * | 10/2002 | Cinkaj | | A47B 96/024 |
| | | | | 108/157.1 |
| 2003/0097920 A1 * | 5/2003 | Ransom | | B23D 47/025 |
| | | | | 83/471.3 |
| 2003/0183303 A1 * | 10/2003 | Heinlen | | B25H 1/12 |
| | | | | 144/285 |
| 2004/0221704 A1 * | 11/2004 | Liu | | B23D 59/003 |
| | | | | 83/520 |
| 2006/0065087 A1 * | 3/2006 | Griswold | | B23Q 3/007 |
| | | | | 83/13 |
| 2006/0101958 A1 * | 5/2006 | Garcia | | B23D 45/062 |
| | | | | 83/13 |
| 2006/0201299 A1 | 9/2006 | Santa Ana | | |
| 2006/0201302 A1 * | 9/2006 | Schwaiger | | B23D 45/068 |
| | | | | 83/477.2 |
| 2008/0022825 A1 | 1/2008 | Spinelli | | |
| 2011/0232805 A1 * | 9/2011 | DeSpain | | B25H 1/14 |
| | | | | 144/285 |
| 2012/0032382 A1 * | 2/2012 | Hendrickson | | B23D 47/04 |
| | | | | 269/86 |
| 2012/0097004 A1 * | 4/2012 | Marinov | | B23D 59/003 |
| | | | | 83/471.2 |
| 2016/0075050 A1 * | 3/2016 | Eiswerth | | B27B 27/06 |
| | | | | 83/468.3 |
| 2017/0167855 A1 * | 6/2017 | Reese | | B23Q 17/2471 |
| 2019/0358719 A1 * | 11/2019 | Lentz | | B27B 5/22 |
| 2020/0122352 A1 * | 4/2020 | Jessop | | B23D 57/0092 |

* cited by examiner

TABLE SAW AND MITER SAW COMBINATION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to saws and more particularly pertains to a new saw for combining the functionalities of table saws and miter saws.

(2) Description of Related Art Including Information Disclosed Under 37 CFR 1.97 and 1.98

The prior art relates to saws.

BRIEF SUMMARY OF THE INVENTION

An embodiment of the disclosure meets the needs presented above by generally comprising a table housing having a table front side separated from a table back side, a table left side separated from a table right side, and a table top side separated from a bottom side defining a table inside. The table top side has a table blade slot extending through to the table inside. A table saw is coupled to the table housing within the table inside and has a table blade extending through the table blade slot. The table saw has a power switch coupled to the table front side. A table fence is coupled to a table front edge and a table back edge of the table top side. A miter housing is coupled to the table housing. The miter housing has an open miter front side, a miter back side, a miter left side, a miter right side, a miter top side, and a miter bottom side. The miter right side is coupled to the table left side. The miter top side has a base cutout. A miter base is pivotably coupled within the base cutout. The miter base has a miter blade slot extending therethrough. A miter fence is coupled to the miter top side adjacent the miter base. A miter saw is coupled to the miter housing. The miter saw has a miter arm pivotably coupled to the miter back side adjacent the miter top side. The miter saw has a miter handle coupled to a distal end of the miter arm. The miter handle has a power trigger.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
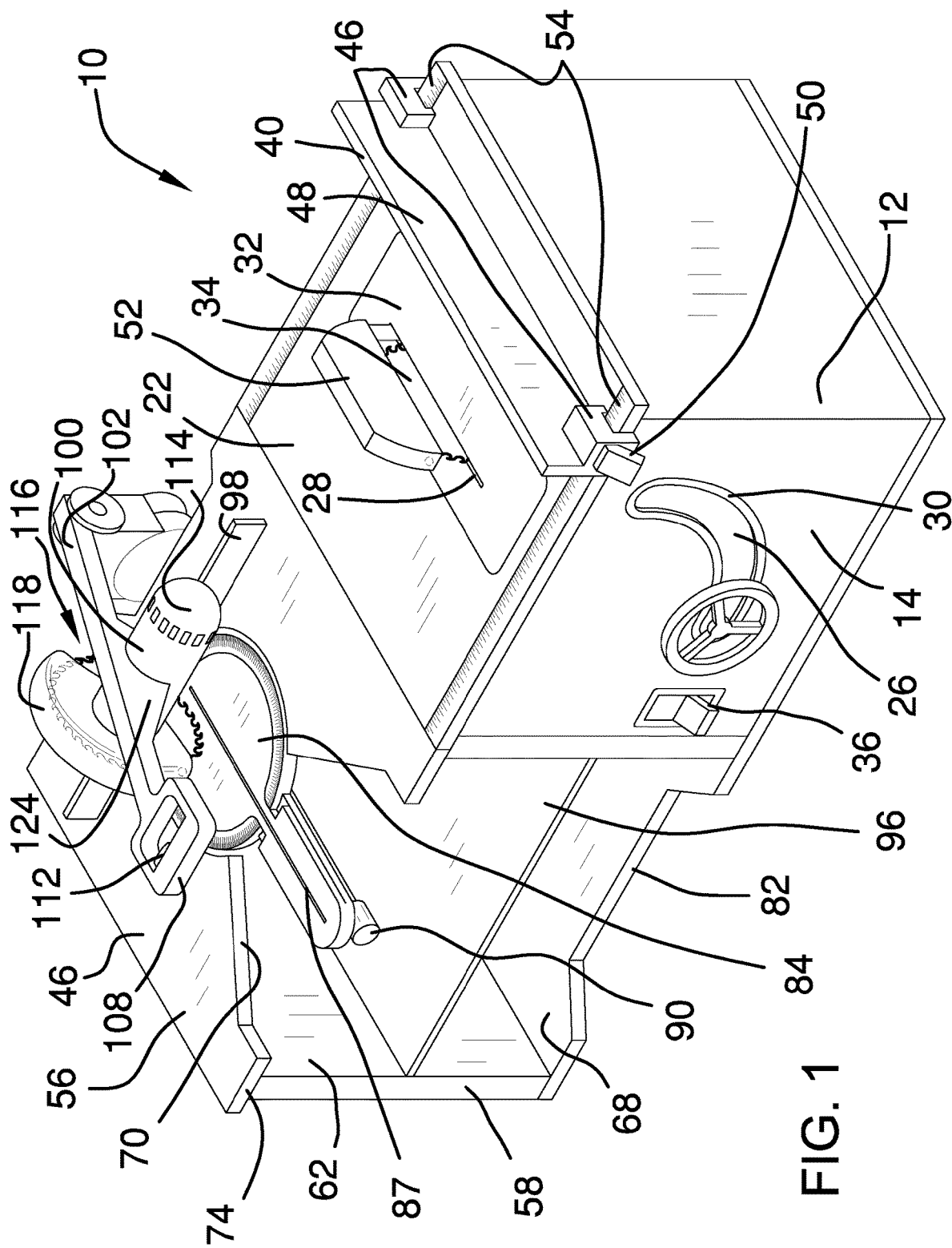
FIG. 1 is an isometric view of a table saw and miter saw combination apparatus according to an embodiment of the disclosure.
Figure 2:
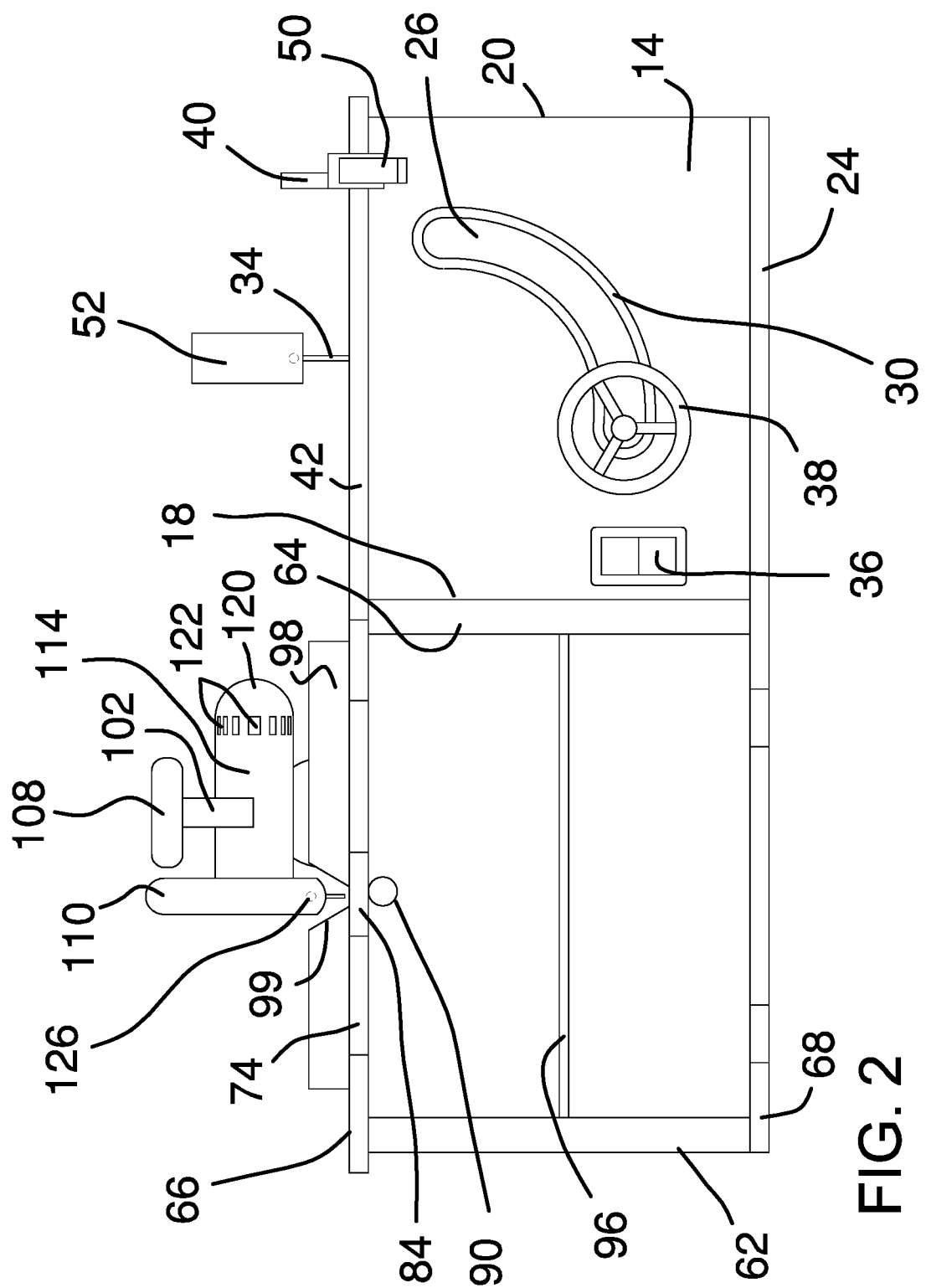
FIG. 2 is a front elevation view of an embodiment of the disclosure.
Figure 3:
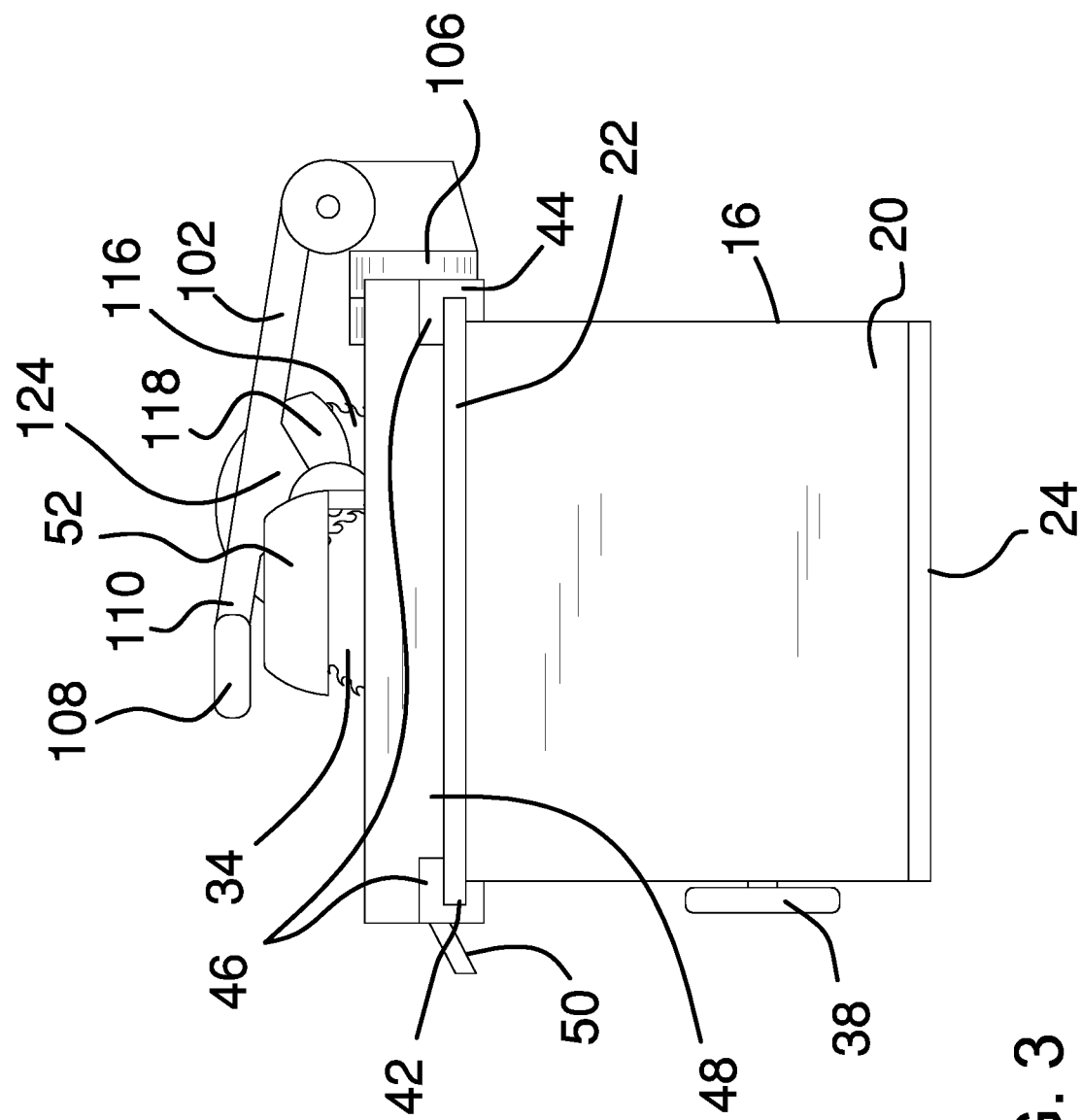
FIG. 3 is a side elevation view of an embodiment of the disclosure.
Figure 4:
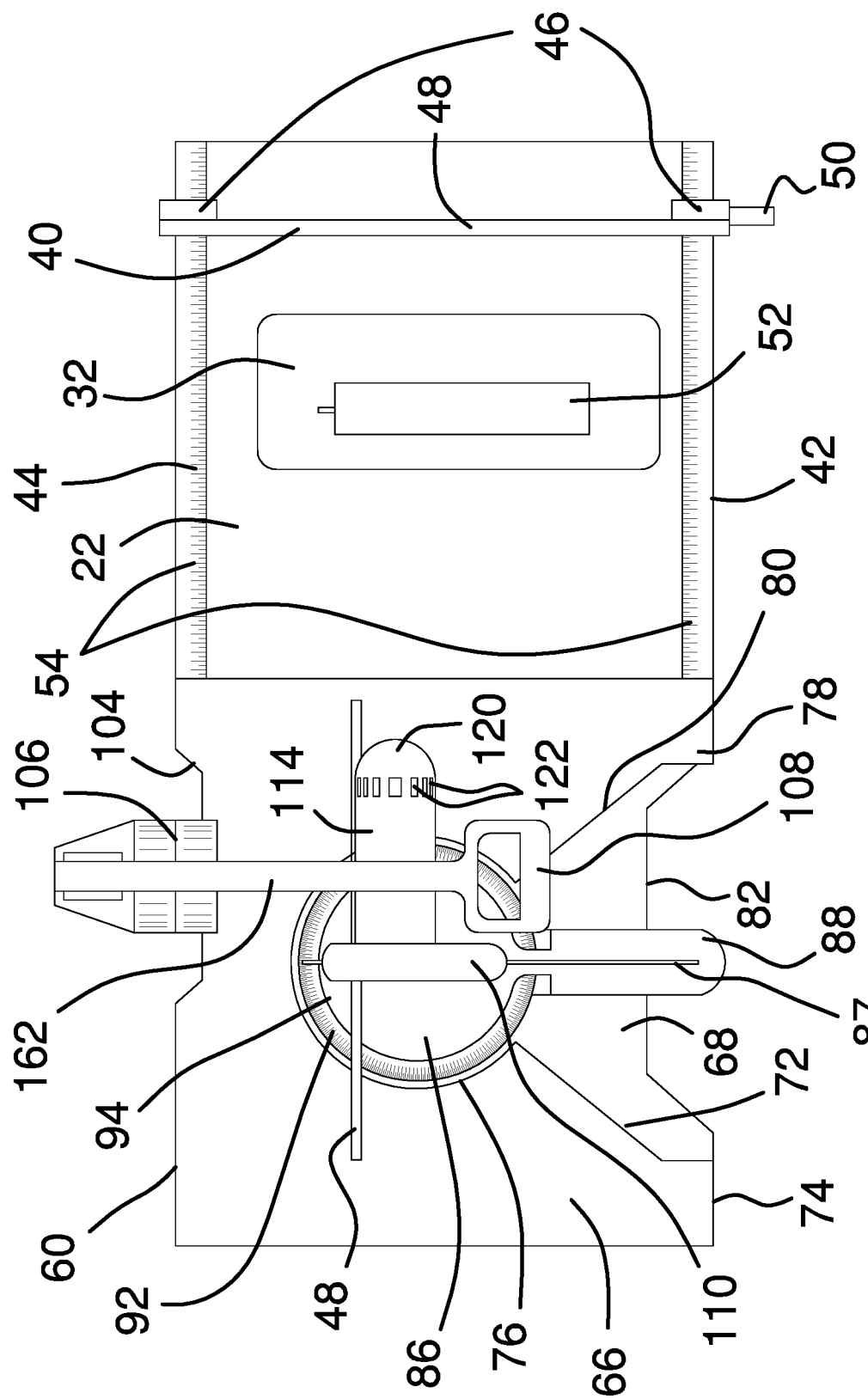
FIG. 4 is a top plan view of an embodiment of the disclosure.

With reference now to the drawings, and in particular to FIGS. 1 through 4 thereof, a new saw embodying the principles and concepts of an embodiment of the disclosure and generally designated by the reference numeral 10 will be described.

As best illustrated in FIGS. 1 through 4, the table saw and miter saw combination apparatus 10 generally comprises a table housing 12 having a table front side 14 separated from a table back side 16, a table left side 18 separated from a table right side 20, and a table top side 22 separated from a bottom side 24 defining a table inside 26. The table top side 22 has a table blade slot 28 extending through to the table inside 26. The table front side 14 has an adjustment slot 30 extending through to the table inside 26. The adjustment slot 30 may be a 90° arc.

A table saw 32 is coupled to the table housing 12 within the table inside 26 and has a table blade 34 extending through the table blade slot 28. The table saw 32 has a power switch 36 coupled to the table front side 14. The table saw 32 has a table adjustment handle 38 extending through the adjustment slot 30. The table adjustment handle 38 may be a round wheel. A table fence 40 is coupled to the table housing 12. The table fence 40 is slidably coupled to a table front edge 42 and a table back edge 44 of the top side 22. The table fence 40 may have a pair of guide portions 46 slidably coupled around the table front edge 42 and the table back edge 44 of the table top side 22 and a fence portion 48 extending therebetween. A fence lock 50 may be coupled to the guide portion 46. A table guard 52 is coupled to the table top side 22 adjacent the table blade slot 28. The table guard 52 is a truncated semicircle. A pair of rulers 54 is coupled to the table front edge 42 and the table back edge 44. The pair of rulers 54 allows the table fence 40 to be accurately aligned to cut a desired distance from the table blade 34.

A miter housing 56 is coupled to the table housing 12. The miter housing 56 has an open miter front side 58, a miter back side 60, a miter left side 62, a miter right side 64, a miter top side 66, and a miter bottom side 68. The miter right side 64 is coupled to the table left side 18. The miter top side 66 has a base cutout 70. The base cutout 70 has a top notched portion 72 extending from a miter front edge 74 of the miter top side 66 and a round rotator portion 76. The top notched portion 72 has a perpendicular section 78 and an angled section 80. The miter bottom side 68 has a trapezoidal bottom notched portion 82 to accommodate a user's feet when standing close to the apparatus 10. A miter base 84 is coupled to the miter housing 56. The miter base 84 has a round main portion 86 rotatably coupled within the rotator portion 76 and a handle portion 88 extending from the main portion 86 within the top notched portion 72. The handle portion 88 has an angle lock knob 90. The miter base 84 has a miter blade slot 87 extending therethrough. The handle portion 88 moves within the top notched portion 72 as the main portion 86 rotates. The rotator portion 76 may have a plurality of incremental angle markings 92 extending around a base perimeter 94 thereof. A storage shelf 96 is coupled to the miter housing 56. The storage shelf 96 is coupled to the miter back side 60, the miter left side 62, and the miter right side 64. A miter fence 98 is coupled to the miter housing 56. The miter fence 98 is coupled to the miter top side 66 adjacent the miter base 84. The miter fence 98 has a V-cutout 99 aligned with the miter blade slot 87.

A miter saw 100 is coupled to the miter housing 56. The miter saw 100 has a miter arm 102 pivotably coupled to the miter back side 60 through a back notched portion 104 of the miter top side 66. The miter arm 102 may have a circular vertical pivot portion 106 coupled to the miter housing 56. The miter saw 100 has a miter handle 108 coupled to a distal end 110 of the miter arm 102. The miter handle 108 has a power trigger 112. The miter saw 100 has a motor housing 114 coupled to the miter arm 102. A miter blade 116 is coupled to the motor housing 114. A miter guard 118 is coupled around the miter blade 116. The motor housing 114 may be cylindrical and may have a hemispherical outer end 120. A plurality of rectangular vent apertures 122 extend through the motor housing 114 adjacent the outer end 120. The miter arm 102 may have a contoured attachment portion 124 conforming to the curvature of the motor housing 114. The vertical pivot portion 106 allows adjustment of an angle formed between the miter blade 116 and the miter base 84. The miter saw 100 has a laser light 126 coupled to the miter guard 118.

In use, the table saw 32 is adjusted as needed with the adjustment handle 38 positioning the table blade 34 and the table fence 40 sliding along the guide portions 46. The power switch 36 is used to operate the table saw 32. The miter saw 100 is positioned with the miter base 84 angled as desired. The laser light 126 casts a laser line onto an object to achieve the desired cut line. The miter handle 108 is secured and the power trigger 112 is depressed to activate the miter saw 100. The miter arm 102 is lowered to perform the cut.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A table saw and miter saw combination apparatus comprising:
    a table housing, the table housing having a table front side opposite a table back side, a table left side opposite a table right side, and a table top side opposite a bottom side defining a table inside, the table top side having a table blade slot extending through to the table inside, the table blade slot being elongated;
    a table saw coupled to the table housing, the table saw being coupled within the table inside and having a table blade extending through the table blade slot, the table saw having a power switch coupled to the table front side;
    a table fence coupled to the table housing, the table fence being slidably coupled to a table front edge and a table back edge of the table top side;
    a pair of rulers coupled to the table housing, the pair of rulers being coupled to the table front edge and the table back edge, the pair of rulers being parallel to each other and perpendicular to a longitudinal axis of the table blade slot;
    a miter housing coupled to the table housing, the miter housing having an open miter front side, a miter back side, a miter left side, a miter right side, a miter top side, and a miter bottom side, the miter right side being coupled to the table left side, the miter top side having a base cutout;
    a miter base coupled to the miter housing, the miter base being pivotably coupled within the base cutout, the miter base having a miter blade slot extending therethrough;
    a miter fence coupled to the miter housing, the miter fence being coupled to the miter top side adjacent the miter base; and
    a miter saw coupled to the miter housing, the miter saw having a miter arm pivotably coupled to the miter back side adjacent the miter top side, the miter saw having a miter handle coupled to a distal end of the miter arm, the miter handle having a power trigger,
    wherein the miter top side has a top notched portion for pivoting a handle portion of the miter base and a back notched portion for receiving and coupling a pivotal portion, wherein the miter top side is coupled on top of the miter left side and the miter right side and wherein the top and back notched portions are offset.

2. The table saw and miter saw combination apparatus of claim 1 further comprising the base cutout of the table top side having the top notched portion extending from a miter front edge of the miter top side and a round rotator portion, the miter base having a round main portion rotatably coupled within the rotator portion and the handle portion extending from the round main portion within the top notched portion, the handle portion having an angle lock knob.

3. The table saw and miter saw combination apparatus of claim 2 further comprising the top notched portion having a perpendicular section and an angled section.

4. The table saw and miter saw combination apparatus of claim 1 further comprising the miter bottom side having a trapezoidal bottom notched portion.

5. The table saw and miter saw combination apparatus of claim 1 further comprising a table guard coupled to the table saw, the table guard being coupled to the table top side adjacent the table blade slot.

6. The table saw and miter saw combination apparatus of claim 5 further comprising the table guard being a truncated semicircle.

7. The table saw and miter saw combination apparatus of claim 1 further comprising the table front side having an adjustment slot extending through to the table inside, the table saw having a table adjustment handle extending through the adjustment slot.

8. The table saw and miter saw combination apparatus of claim 1 further comprising the miter saw having a motor housing coupled to the miter arm, a miter blade coupled to the motor housing, and a miter guard coupled around the miter blade.

9. The table saw and miter saw combination apparatus of claim 8 further comprising a laser light coupled to the miter guard.

10. The table saw and miter saw combination apparatus of claim 1 further comprising a storage shelf coupled to the miter housing, the storage shelf being coupled to the miter back side, the miter left side, and the miter right side.

11. A table saw and miter saw combination apparatus comprising:
   a table housing, the table housing having a table front side separated from a table back side, a table left side separated from a table right side, and a table top side separated from a bottom side defining a table inside, the table top side having a table blade slot extending through to the table inside, the table blade slot being elongated, the table front side having an adjustment slot extending through to the table inside;
   a table saw coupled to the table housing, the table saw being coupled within the table inside and having a table blade extending through the table blade slot, the table saw having a power switch coupled to the table front side, the table saw having a table adjustment handle extending through the adjustment slot;
   a table fence coupled to the table housing, the table fence being slidably coupled to a table front edge and a table back edge of the table top side;
   a table guard coupled to the table saw, the table guard being coupled to the table top side adjacent the table blade slot, the table guard being a truncated semicircle;
   a pair of rulers coupled to the table housing, the pair of rulers being coupled to the table front edge and the table back edge, the pair of rulers being parallel to each other and perpendicular to a longitudinal axis of the table blade slot;
   a miter housing coupled to the table housing, the miter housing having an open miter front side, a miter back side, a miter left side, a miter right side, a miter top side, and a miter bottom side, the miter right side being coupled to the table left side, the miter top side having a base cutout, the base cutout having a top notched portion extending from a miter front edge of the miter top side and a round rotator portion, the top notched portion having a perpendicular section and an angled section, the miter bottom side having a trapezoidal bottom notched portion;
   a miter base coupled to the miter housing, the miter base having a round main portion rotatably coupled within the rotator portion and a handle portion extending from the main portion within the top notched portion, the handle portion having an angle lock knob, the miter base having a miter blade slot extending therethrough;
   a storage shelf coupled to the miter housing, the storage shelf being coupled to the miter back side, the miter left side, and the miter right side;
   a miter fence coupled to the miter housing, the miter fence being coupled to the miter top side adjacent the miter base; and
   a miter saw coupled to the miter housing, the miter saw having a miter arm pivotably coupled to the miter back side adjacent the miter top side, the miter saw having a miter handle coupled to a distal end of the miter arm, the miter handle having a power trigger, the miter saw having a motor housing coupled to the miter arm, a miter blade coupled to the motor housing, and a miter guard coupled around the miter blade, the miter saw having a laser light coupled to the miter guard,
   wherein the miter top side has the top notched portion for pivoting the handle portion of the miter base and a back notched portion for receiving and coupling a pivotal portion, wherein the miter top side is coupled on top of the miter left side and the miter right side and wherein the top and back notched portions are offset.

* * * * *